July 8, 1969  J. R. MEADE  3,454,246
CHRISTMAS TREE HOLDER AND SUPPORT
Filed April 25, 1967  Sheet 1 of 2
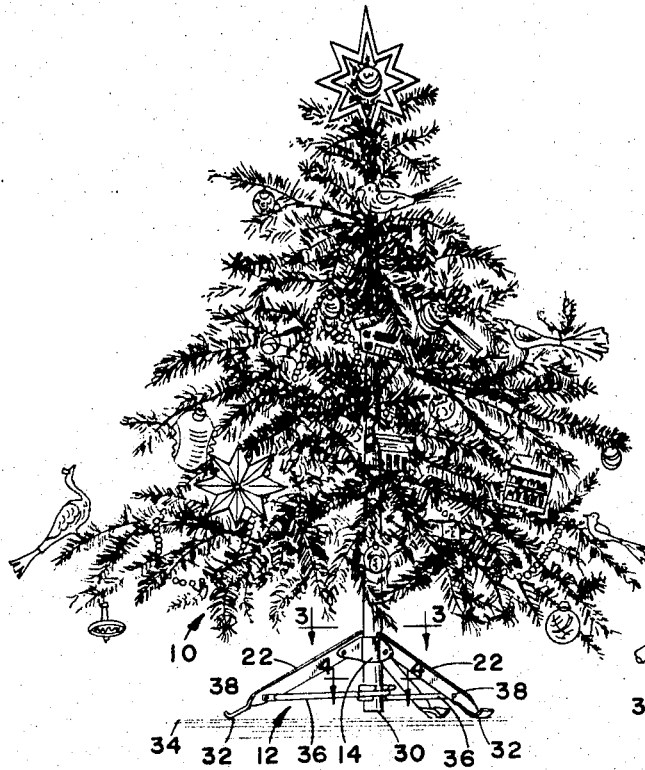
FIG. 1
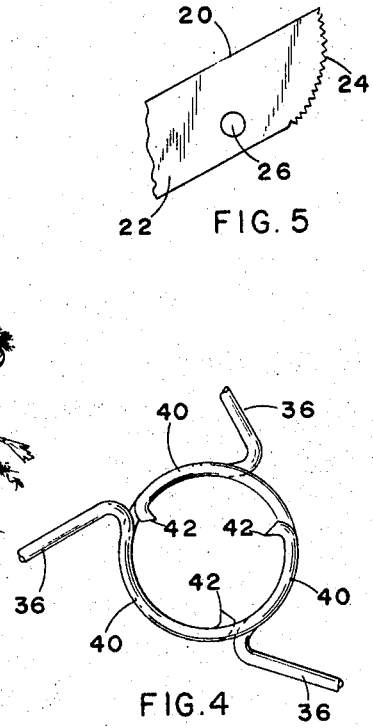
FIG. 5
FIG. 4
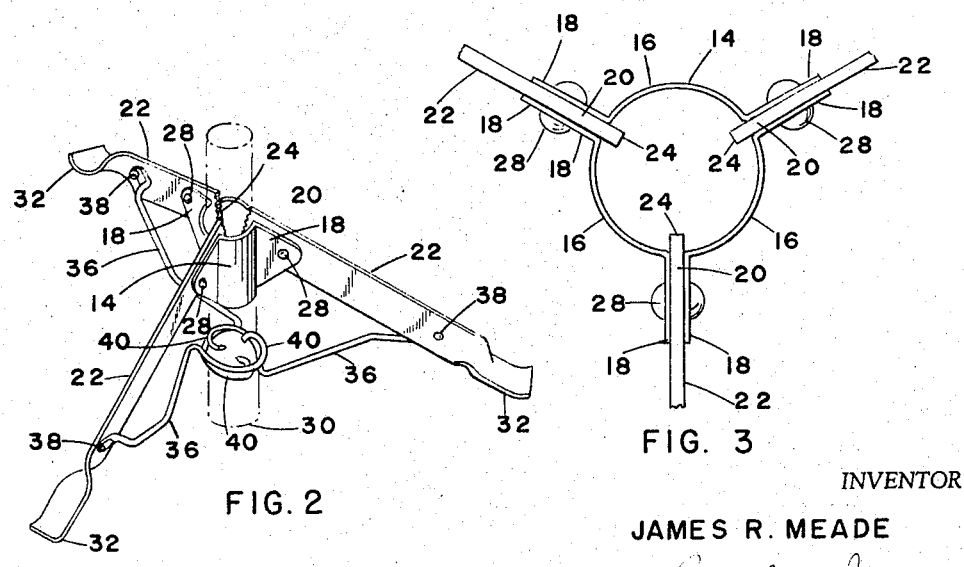
FIG. 2
FIG. 3
INVENTOR
JAMES R. MEADE
BY
ATTORNEY

INVENTOR
JAMES R. MEADE

BY
ATTORNEY

United States Patent Office 3,454,246
Patented July 8, 1969

3,454,246
CHRISTMAS TREE HOLDER AND SUPPORT
James R. Meade, 302 Newington Drive,
Hatboro, Pa. 19040
Filed Apr. 25, 1967, Ser. No. 633,520
Int. Cl. A47g 33/12, 25/12; A01k 97/10
U.S. Cl. 248—47     3 Claims

ABSTRACT OF THE DISCLOSURE

A holder to support a Christmas tree vertically and braced at two vertically spaced locations by circumferentially spaced legs pivoted to collar means and having cam surfaced means at one end to engage said trunk by said cam surfaces with increasing firmness as said legs are moved outward and upward at the outer ends relative to engaging a horizontal supporting surface, and bracing means connected to said legs intermediately of the ends thereof engage a lower portion of said tree trunk than the cam means engage as the legs move outward as aforesaid to support the tree braced in vertical position.

BACKGROUND OF THE INVENTION

Many types of Christmas tree holders are available, but primarily are for use with natural trees. In recent years, the advent of various type of artificial trees has produced certain problems with respect to Christmas tree holders suitably engaging the trunks of artificial trees which, in general, are of two principal types. One type comprises a wooden trunk of uniform diameter, at least at the base end, and provided with inwardly and downwardly extending holes at spaced locations thereon for purposes of receiving the inner ends of artificial branches. Another very popular type of artificial tree comprises a trunk which is formed of tubular metal, of uniform diameter at least at the lower portion thereof and having metal foil type branches or the like suitably affixed to the trunk.

Both types of the trunks of the artificial trees referred to above, in general, are of a smaller diameter at the lower ends thereof than the corresponding lower ends of the trunks of natural trees of corresponding size, whereby many types of conventional tree holders presently available are not readily capable of holding such trunks of artificial Christmas trees, particularly in a manner that results in relatively little marking or disfiguring of the trunks, whereby such artificial trees may be used for a number of years if carefully stored between seasons.

Among the rather substantial number of existing patents on Christmas tree holders, the following have been selected as representative of the type presently available: 1,273,639, Lyons, 1918; 1,497,683, Hall, 1924; 2,014,896, Hollander, 1935; 2,028,129, Allerton, 1936; 2,679,994, Mellen, 1954; 2,689,701, Whitaker, 1954; 2,727,708, Lorenzen, 1955; and 2,909,344, Dutton, 1959.

SUMMARY OF THE INVENTION

The present invention comprises several embodiments of Christmas tree holders and supports primarily adapted to receive and be connected to the lower end portions of the trunks of several different types of artificial Christmas trees, particularly those of which at least the lower portions of the trunks are of uniform diameter and generally smaller than the diameters of the trunks of corresponding sizes of natural trees. Essentially, these embodiments of tree holders and supports comprise collar-like means which receive a portion of the artificial tree trunk spaced upwardly from the terminal lower end thereof, and bracing means are arranged to engage the tree trunk at a still lower location, whereby the trunk is engaged at vertically spaced locations to effect adequate bracing of the tree against tilting or falling.

A plurality of outwardly and downwardly extending legs are pivotally connected adjacent the upper ends thereof to said collar-like means and said ends of the legs are provided with gradually spiralled cam surfaces which frictionally engage the trunk of the tree effectively and with progressive pressure, while the legs extend outward and downward from said collar-like means, said legs being spaced therearound at circumferentially even distances. The bracing means are connected to the legs intermediately of the ends thereof and extend inward from the legs to engage a portion of the trunks of the trees below that engaged by said cam surfaces.

In particular, the several embodiments of bracing means are provided respectively for use with artificial or natural wooden trunks and artificial tubular metal trunks of Christmas trees. The embodiment which is for use with wooden trunks includes sharpened spikes which project into the trunks a limited distance to provide effective, though limited, attachment to the trunk of a tree during use. The weight of the tree tends to move the lower ends of the legs outwardly and thereby more firmly engage the prong means with the trunk.

In the embodiment adapted for use with tubular trunks of artificial trees, an upwardly tapered, centering member, somewhat resembling a plug, is moved vertically upward into the hollow terminal end of the tubular trunk as the legs tend to move outwardly due to the weight of the tree. Such movement simultaneously causes the cam means at the upward and inner ends of the legs to more firmly and frictionally engage the trunk as the lower end of the legs are moved outwardly due to the weight of the tree. Both embodiments of bracing means operate automatically to effect centering of the lower end portion of the trunk with respect to the legs and thereby maintain the tree substantially vertically upon a horizontal supporting surface.

DESCRIPTION OF THE DRAWINNGS

FIG. 1 is a side elevation of an exemplary artificial Christmas tree, the lower end of the trunk of which is illustrated as being supported by one embodiment of holding and support means made in accordance with the principles of the present invention.

FIG. 2 is an enlarged, perspective view of the embodiment of holding and support means illustrated in FIG. 1 and shown in engagement with a fragmentary portion of an exemplary trunk of an artificial tree illustrated in phantom.

FIG. 3 is a fragmentary, still further enlarged top plan view of the collar-like means of the embodiment of tree holder shown in FIGS. 1 and 2, as seen on the line 3—3 of FIG. 1.

FIG. 4 is a view similar in scale to FIG. 3, but illustrating, fragmentarily, in plan view, portions of the embodiment of bracing means of the type shown in FIGS. 1 and 2, as seen on the line 4—4 of FIG. 1.

FIG. 5 is a side elevation of a fragmentary upper portion of one of the legs of the embodiment shown in the preceding figures.

DESCRIPTION OF THE PREFERRED EMBODIMENTS

Figure 6:
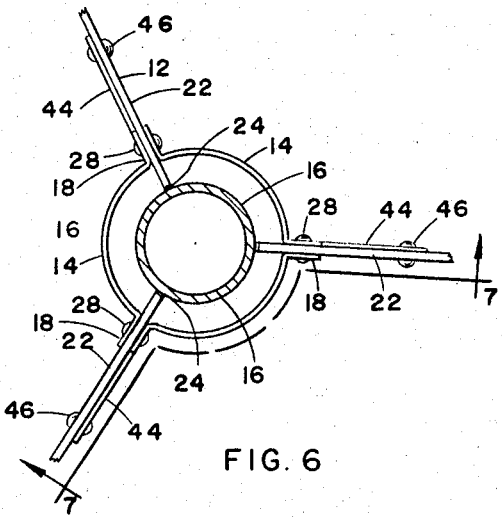
FIG. 6 is a fragmentary top plan view of the upper portion of another embodiment of tree holder incorporating principles of the present invention, as seen on the line 6—6 of FIG. 7.

Referring to FIG. 1, an exemplary Christmas tree 10 is shown therein supported in one embodiment of tree holding and support means 12, hereinafter referred to as a tree holder. Although the several embodiments of tree holders described hereinbelow and illustrated in the drawing which embody the principles of the invention have been designed primarily for use with artificial trees having at least the lower portions of the trunks of uniform diameter, at least the embodiment of the invention illustrated in FIGS. 1–5 may be used with natural trees, if the diameters of the lower portions of the trunks are of such size as to be accommodated therein.

The embodiment of tree holder 12 shown in FIG. 1 comprises collar-like means which, essentially, comprises a plurality of similar segments 16, which are arcuate and have similar ears 18 on opposite ends thereof which extend radially outward from the arcuate segments 16. Adjacent ears 18 on the related segments are parallel to each other for receiving, pivotally, therebetween the normally upper ends 20 of legs 22.

In side elevation, the terminal surfaces of the upper ends 20 of the legs 22 each comprise a segment of a spiral cam surface 24 which is somewhat parabolic and, preferably, is finely serrated, transversely, as illustrated in exemplary manner in FIG. 5. The center of the spiral 24 approximately is coincident with the pivot hole 26 through which, preferably, a rivet 28 extends, opposite ends thereof being similarly headed for purposes of pivotally and permanently connecting the legs 22 between the ears 18 of the collar-like segments 16 for ease of operation of the legs as described hereinafter.

From the foregoing construction, due to the segments 16 being permanently connected together by the rivets 28, they comprise a composite sleeve structure which is slightly larger in diameter than the lower portion 30 of the trunk of the trees 10 intended to be supported thereby. In the embodiment of the invention illustrated in FIGS. 1–5, it is preferred that the tree 10 is of an artificial type of which the trunk is formed of wood. At least the lower portion 30 of said trunk is of uniform diameter which preferably fits relatively closely within the collar-like means 14.

With such an arrangement, when the outer and lower extremities 32 of legs 22, which preferably are rounded for engagement with a horizontal surface 34 such as a floor, the weight of the tree normally is sufficient to move the outer ends of legs 22 outwardly and upwardly so as to bring the upper portions of the spiral cam surfaces 24 progressively into firmer frictional engagement with the trunk 30 of the tree 10. When the trunk is formed of wood, the serrations of the cam surfaces 24 will at least partially bite into the exterior surface of the trunk of the tree so as to enhance firm gripping engagement of the legs with the trunk and thereby support the trunk of the tree substantially vertically to the floor surface 34, for example.

For purposes of holding the tree vertically upright, the tree holder 12 includes one embodiment of bracing means, details of which are best shown in FIGS. 1, 2 and 4. This embodiment comprises a plurality of similar links 36. The outer ends thereof are pivotally connected to the legs 22, intermediately of the ends thereof, by pin means such as rivets 38 which extend through complementary, aligned holes in the legs 22 and preferably flattened end portions in the links 36. Said links effectively may be formed from wire stock of suitable gauge. The opposite ends 40 of links 36 are shaped arcuately preferably so that each of said ends 40 extend more than 180° around trunk 30 of the tree, terminating in a sharpened prong 42.

As illustrated particularly in FIG. 2, it will be seen that said arcuate opposite ends 40, when placed in operative position with respect to the lower portion of trunk 30, at a position below that which is within the collar-like means or engaged by cams 24, at least partially overlap each other and, as viewed in FIG. 4, it will be seen that the same cooperate to completely encircle the trunk 30 of the tree. Further, as the outer end portions 32 of the legs 22 are moved outwardly, the sharpened prongs 42 will project at least slightly into the surface of the trunk 30 of the tree and thus effectively hold the bracing links 30 substantially in horizontal position, as viewed in FIG. 1. Thereby, the tree is supported in substantially vertical position and the weight of the tree upon the tree holder will maintain the same in this relationship with respect to the tree, when in use, at all times.

Figure 7:
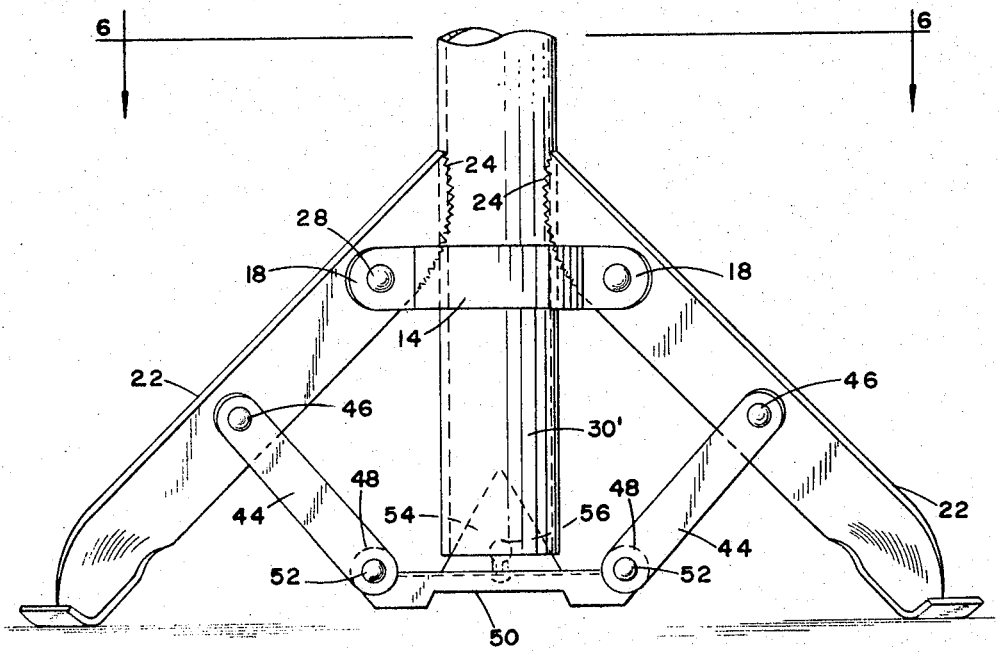
FIG. 7 is a fragmentary, enlarged side elevation of the embodiment of tree holder shown in FIG. 6, as seen on the line 7—7 of said figure.
Figure 8:
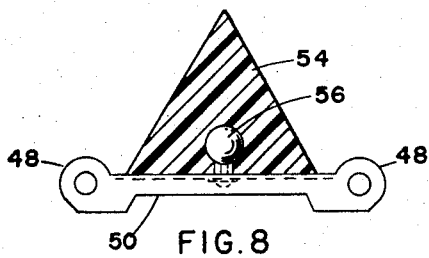
FIG. 8 is a side elevation of a portion of the bracing means illustrated in the lower portion of FIG. 7, one element of said means being shown in vertical cross-section to illustrate details of the connecting means employed.

Referring to FIGS. 6–8, another embodiment of tree holder 12' is shown, adapted particularly for connection to the lower portion of the trunk 30' of an artificial tree wherein said trunk is of a tubular nature and formed from metal or other suitable material, such as molded plastics or the like. In this embodiment, the legs 22 are similar to those of the embodiment shown in FIGS. 1–5, as are also the cam surfaces 24 and the collar-like means 14 comprising similar segments 16 having ears 18 and connecting rivets 28 by which the upper and inner ends of the legs 22 are connected to the collar-like means 14, preferably permanently.

The essential difference between the tree holder embodiment shown in FIGS. 6–8 and that in the preceding figures lies primarily in the difference in the bracing means employed in the several embodiments. Referring particularly to FIG. 7, it will be seen that the connecting means illustrated therein comprise a series of similar links 44 which at one end are connected pivotally to the legs 22, intermediately of the ends thereof, preferably permanently, by means of rivets 46 or equivalent connecting means. The opposite ends of the links 44 are pivotally connected to similar ears 48 formed at circumferentially spaced locations upon the perimeter of a suitable plate 50, which preferably is circular, such pivotal connectings being effected by additional rivets 52 or the like, as shown in FIG. 7. The plate 50 and ears 48 may be formed from sheet metal, molded from plastics, or otherwise.

Extending upwardly from plate 50 is a conical centering member 54. The member 54 tapers upwardly and preferably is formed from yieldable material such as a rubber-like substance of which certain forms of plastics are available or, if desired, rubber compounds may be used. The largest diameter of the centering member 54, such as at the base thereof, should at least be equal to the inner diameter of the tubular trunk 30' in order that the centering member may be received within the lower end thereof as shown in FIG. 7. An upwardly projecting bulbous member 56 fixed to plate 50 projects into a complementary recess in member 54 to connect the same to said plate.

Referring to FIG. 7, it will be seen that when the lower end portion of the trunk 30' is disposed within the collar-like means 14, and the lower ends of the legs 22 are moved outwardly and upwardly with respect to means 14, as explained above with respect to the embodiment shown in FIGS. 1–5, spiral cam surfaces 24 will progressively engage the external surfaces of the trunk 30', at evenly circumferentially spaced locations and thereby firmly grip said trunk. Coincident with such gripping action by the cams 24, such outward movement of the legs causes progressively increasing frictional engagement of cams 24 with the trunk 30' and also causes links 44 to move radially outward, thereby elevating the plate 50 with the centering member 54 thereon to dispose the latter in centering engagement within the interior of the terminal lower end of trunk 30', as illustrated in FIG. 7.

The yieldable nature of the centering member 54 permits ready adjustment of the member to the interior of the trunk 30'. Thus, the initial positioning of the embodiment of tree holder 12' with respect to the trunk 30' is such that when the cam surfaces 24 have been brought firmly and grippingly into engagement with the trunk 30', the centering member 54 will be in operative position within the lower end of the trunk 30'. When the tree holder and trunk are so arranged, the weight of the tree will be adequate to maintain such assembled relationship of the tree holder with the trunk as just described and the length of the legs, as in regard to the embodiment of FIGS. 1–5, is such as to effectively support the tree vertically with respect to a horizontal supporting surface and also prevent the same from tipping or tilting.

It will be seen from the foregoing that both embodiments of the invention described above are capable of being quickly assembled with respect to several different types of artificial trees, as well as one embodiment being capable of use with natural trees. Both embodiments are capable of automatic engagement with the trunks of the trees due to the cam action which provides frictional engagement at one location upon the trunks, while co-operating bracing means engage another location of the trunk at a position below the first position, thereby affording effective bracing of the tree against tilting and maintaining support thereof in a vertical manner. No tools are required to effect the connection of the tree holders with respect to the trunks of the trees and yet firm clamping engagement is effected by said spiral cam surfaces as the lower ends of the legs are moved outward into final supporting position, which movement simultaneously places the lower supporting means in operative position with respect to a lower portion of bottom end of the trunk of the tree to prevent tilting thereof from a desired vertical position.

While the invention has been described and illustrated in its several preferred embodiments, it is to be understood that the invention is not to be limited to the precise details herein illustrated and described since the same may be carried out in other ways falling within the scope of the invention.

I claim:

1. Holding and support means arranged to engage the lower portion of the cylindrical hollow tubular trunk of an artificial Christmas tree to support the same substantially vertically and comprising in combination, substantially circumferentially continuous collar-like means arranged to surround the lower trunk portion of a tree above its lower terminal end, and comprising a plurality of segments of a circle each having similar ears on opposite ends, a plurality of similar legs spaced circumferentially evenly around said collar-like means, one end of each leg being positioned between adjacent pairs of said ears on adjacent segments, pin means extending between said pairs of ears and through the end of the leg positioned therebetween, thereby pivotally connecting said legs and said segments of said collar-like means together to permit the opposite end of each leg to extend radially outward and downward from said collar-like means for even engagement with a horizontal supporting surface, said one end of each leg having similar spiral cam surfaces respectively engageable with said tree trunk progressively more firmly as said legs are pivotally swung outward from the tree trunk about said pivot means, and bracing means comprising a series of similar links respectively pivotally connected at one end to each leg intermediately of the ends thereof and the opposite ends of said links being pivotally connected to an upwardly tapering centering means adapted to be projected upwardly into the hollow lower end of said tree trunk as the lower ends of said legs are moved outwardly to cause said cam surfaces to engage the trunk of said tree firmly and thereby maintain said tree substantially vertical relative to said supporting surface.

2. The tree holding and support means according to claim 1 in which said centering means is provided with circumferentially spaced ears and said links comprise flat strips, the opposite ends of said strips being parallel respectively to said legs and ears for pivotal connection thereto by pin-like means extending therethrough.

3. The tree holding and support means according to claim 1 in which said upwardly tapered centering means is formed from yieldable rubber-like material arranged to be temporarily deformed incident to engaging the hollow lower end of said tree trunk when being moved upwardly into supporting engagement therewith.

References Cited

UNITED STATES PATENTS

| | | | |
|---|---|---|---|
| 1,729,129 | 9/1929 | Seelav | 248—47 |
| 2,471,124 | 5/1949 | Smith | 248—47 |

CHANCELLOR E. HARRIS, *Primary Examiner.*

FRANK DOMOTOR, *Assistant Examiner.*